(12) United States Patent
Safi et al.

(10) Patent No.: US 11,841,971 B2
(45) Date of Patent: Dec. 12, 2023

(54) SYSTEMS AND METHODS FOR CUSTOMER DATA HANDLING

(71) Applicant: Oracle International Corporation, Redwood City, CA (US)

(72) Inventors: Farhat Safi, Hayward, CA (US); Naganand Abbaraju, Frisco, TX (US); Srinivas Thanneeru, Fremont, CA (US); Rahul Saraf, Frisco, TX (US); Alhad Shewade, Dublin, CA (US); Venkatesh Solasa, Hyderabad (IN); Veera Venkata Satyanarayana Desina, Hyderabad (IN); Rajesh Vig, Noida (IN); Flemming Christensen, Plymouth, MA (US); Lawrence Klein, Saint Charles, IL (US)

(73) Assignee: Oracle International Corporation, Redwood City, CA (US)

( * ) Notice: Subject to any disclaimer, the term of this patent is extended or adjusted under 35 U.S.C. 154(b) by 296 days.

(21) Appl. No.: 17/036,300

(22) Filed: Sep. 29, 2020

(65) Prior Publication Data
US 2022/0100892 A1 Mar. 31, 2022

(51) Int. Cl.
  *G06F 9/455* (2018.01)
  *G06F 21/62* (2013.01)
  *G06Q 30/01* (2023.01)

(52) U.S. Cl.
  CPC ...... *G06F 21/6245* (2013.01); *G06F 9/45558* (2013.01); *G06Q 30/01* (2013.01); *G06F 2009/45595* (2013.01); *G06F 2221/2141* (2013.01)

(58) Field of Classification Search
None
See application file for complete search history.

(56) References Cited

U.S. PATENT DOCUMENTS

| 9,697,352 B1* | 7/2017 | Armstrong | G06F 21/57 |
| 2011/0113467 A1* | 5/2011 | Agarwal | G06F 21/53 |
| | | | 718/1 |
| 2012/0110328 A1* | 5/2012 | Pate | H04L 63/045 |
| | | | 713/165 |

(Continued)

FOREIGN PATENT DOCUMENTS

WO 2017079615 A1 5/2017

*Primary Examiner* — Trang T Doan

(57) ABSTRACT

Various embodiments of the present technology generally relate to systems and methods for secure customer data handling. More specifically, some embodiments relate to handling of derivative data as a provider in a manner that supports security and provides a stronger level of control over the data. The solution supports four core principles of customer data handling: no export of customer data, unless authorized; remote operations only via shell access or equivalent; temporary and task-based privileges; and diagnostic data to be ephemeral. The customer data handling system herein includes a central repository for the storage of diagnostic data, an upload tool for uploading to the central repository and automated staging on containers, a diagnostic virtual machine that enables task-based access to diagnostic data and analysis tools hosted on a dedicated container, and an application for handling requests, provisioning and staging containers, and purging.

17 Claims, 10 Drawing Sheets

(56) References Cited

U.S. PATENT DOCUMENTS

| | | | | |
|---|---|---|---|---|
| 2014/0165137 A1* | 6/2014 | Balinsky | ............. | G06F 21/6245 |
| | | | | 726/1 |
| 2015/0135013 A1* | 5/2015 | Thomas | ................ | G06Q 10/20 |
| | | | | 714/27 |
| 2019/0370137 A1* | 12/2019 | Bellingan | ............ | G06F 11/2294 |
| 2019/0391834 A1* | 12/2019 | Mullen | ................ | G06F 9/5005 |
| 2020/0036581 A1 | 1/2020 | Pannem | | |
| 2021/0042771 A1* | 2/2021 | Sharma | ................. | G06N 20/00 |
| 2021/0240839 A1* | 8/2021 | Tsirkin | ................. | G06F 21/554 |
| 2021/0303320 A1* | 9/2021 | Lee | ..................... | G06F 12/0253 |

\* cited by examiner

| Category | Support/Bug/JIRA Attachments | Shareable Outside CNA | Pre-Approved |
|---|---|---|---|
| Your Content | Not Permitted | Only when Aggregated/ Obfuscated | Customer Request |
| Customer Data | Not Permitted | Only when Aggregated/ Obfuscated | Billing & Metering – Cloud Portal |
| Service Analysis Data | Not Permitted | Only when Aggregated/ Obfuscated | Yes, when aggregated/ obfuscated |
| Diagnostic Data | Sensitive - Not Permitted Non-Sentitive - Permitted | By SaaS Engineering Approval | Permitted |
| Control Data | Not Permitted | No | No preapproval. Subject to data export governance process. |

FIGURE 8

SYSTEMS AND METHODS FOR CUSTOMER DATA HANDLING

TECHNICAL FIELD

Various embodiments of the present technology generally relate to secure customer data handling. More specifically, embodiments of the present technology relate to systems and methods for handling customer data as a service provider in a manner that supports the core security principles of customer data handling and provides a stronger level of control over derivative data and the entire lifecycle of customer data.

BACKGROUND

Cloud service providers are trusted by their customers to manage and maintain services containing sensitive data fed into or created in the service offering. Service providers are trusted by their customers to be trustworthy custodians of customer data. Services may include software as a service (SaaS), platform as a service (PaaS), or infrastructure as a service (IaaS) in addition to other cloud services. Customer data protection scope may include any and all digital assets (i.e., files) that may be subject to contractual, statutory and/or other legal obligations. These obligations may vary according to geographic or jurisdictional area (such as Europe, the United States, China, California, etc.) Examples of data subject to such obligations include, but are not limited to, (1) customer content, which includes but is not limited to all software data (including personal data and personally identifying information), text, images, audio, video, photographs, third-party applications, and other content and materials, in any format, provided by customers or any of a customer's users that is stored in, or run on or through, the services and (2) derivative data, which includes but is not limited to customer specific metadata that may be used for maintenance, troubleshooting, monitoring, usage analysis, billing, capacity planning, training, service enhancement, security and operations research, service development, and other cloud service provider functions. A service provider is required to meet certain requirements in the handling of customer data, such as privacy, security, and the right to erasure, and attempting to locate, account for or remove data can be difficult if it is not properly tracked throughout its lifetime. Removing data, for example, requires knowing or figuring out where the data exists and if it is replicated, such as if it is in a backup system, a log repository system, and the like. If data is allowed to leave the secure environment (e.g., the cloud), trackability is lost on that data.

When data is downloaded, to an engineer's computer for analysis, for example, trackability of that data is lost and the provider can no longer guarantee that they know where all instances of that data exist, what it was used for, or where it was copied to. Thus, adhering to General Data Protection Regulation (GDPR), California Consumer Privacy Act (CCPA), and Clarifying Lawful Overseas Use of Data (CLOUD) Act regulations such as the right to erasure and the right to be forgotten requires tremendous trust within a provider's taskforce. For example, personally identifying information (PII) and logs may be downloaded to an engineer's workspace (e.g., laptop) to assess an incident and the engineer is then responsible for remembering to delete it upon completion of their work.

Nonetheless, diagnostic data is traditionally downloaded to an engineer's (i.e., customer support, development, operations engineers) local workstation for parsing and analysis purposes. This means that customer data is extracted out of the secure production environment (e.g., the cloud) and is impossible to fully track, secure, and purge. Cloud providers (e.g., PaaS, SaaS, private clouds, on-premises deployments, etc.) have historically approached this issue by excluding derivative data from the scope of protection provided to customer content. However, the solution disclosed herein provides a means for the inclusion of derivative data in the scope of protection provided to customers, while still allowing access for troubleshooting and other diagnostic purposes.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for securely handling customer data and enabling providers to have more control over derivative data. In an embodiment, a computing apparatus for handling customer data comprises one or more computer readable storage media, one or more processing systems, and program instructions stored on the one or more computer readable storage media that, when executed by the one or more processing systems, direct the one or more processing systems to, in response to a request from a data accessor to access data for a task, identify data associated with the task stored in a data repository. The program instructions further direct the processing system to provision a container for the task, wherein the container comprises the data associated with the task and at least one data analysis tool, provide the data accessor access to the container, and, after the one or more data accessors have exited or otherwise finished using the container, purge the container from the computing apparatus.

In an embodiment, the program instructions further direct the processing system to maintain the data repository, wherein the data repository comprises data for a plurality of tasks. The program instructions may further direct the processing system to, prior to provisioning the container for the task, determine if the data accessor is approved to access the data associated with the task. The program instructions may further direct the processing system to, after provisioning the container for the task, notify the data accessor that the container is ready. The program instructions may further direct the processing system to, prior to purging the container from the computing apparatus, detect that the data accessor has exited the container. In some embodiments, the container prevents the data accessor from exporting the data associated with the task from the container. In some embodiments, the container is hosted on a virtual machine. In certain embodiments, the program instructions, to purge the container from the computing apparatus, direct the processing system to identify a wait time for purging the container and purge the container from the computing apparatus once the wait time has elapsed.

In an alternative embodiment, a method of securely handling customer data comprises identifying data associated with an incident stored in a data repository and provisioning a container for the incident, wherein the container comprises the data associated with the incident and at least one data analysis tool. The method further comprises providing a data accessor access to the container, and, after the one or more data accessors have exited or otherwise finished using (e.g., left idle for a certain amount of time) the container, purging the container from the system. An incident may include the occurrence of any event or state related to a provided service as described herein. In some examples, an incident includes a dataset related to normal functioning of a provided service. Additional examples of incidents may include, for example, an occurrence of abnormal functioning, the occurrence of normal functioning, a data upload event from a CDH upload tool, an error, an error report, a bug incident, or a similar scenario for which the data accessor may wish to access data for purposes of evaluating general performance, fixing bugs, addressing errors, or other general analysis, observation, tuning, verification, or investigation.

In yet another embodiment, one or more non-transitory computer-readable storage media have program instructions stored thereon to facilitate secure customer data handling that, when read and executed by a processing system, direct the processing system to, in response to a request from an data accessor to access data for an task, identify data associated with the task stored in a data repository. The program instructions further direct the processing system to provision a container for the task, wherein the container comprises the data associated with the task and at least one data analysis tool, provide the data accessor access to the container, and, after the one or more data accessors have exited the container, purge the container from the system.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 8 illustrates a table of data categories relevant to customer data handling in accordance with some embodiments of the present technology;

Figure 1:
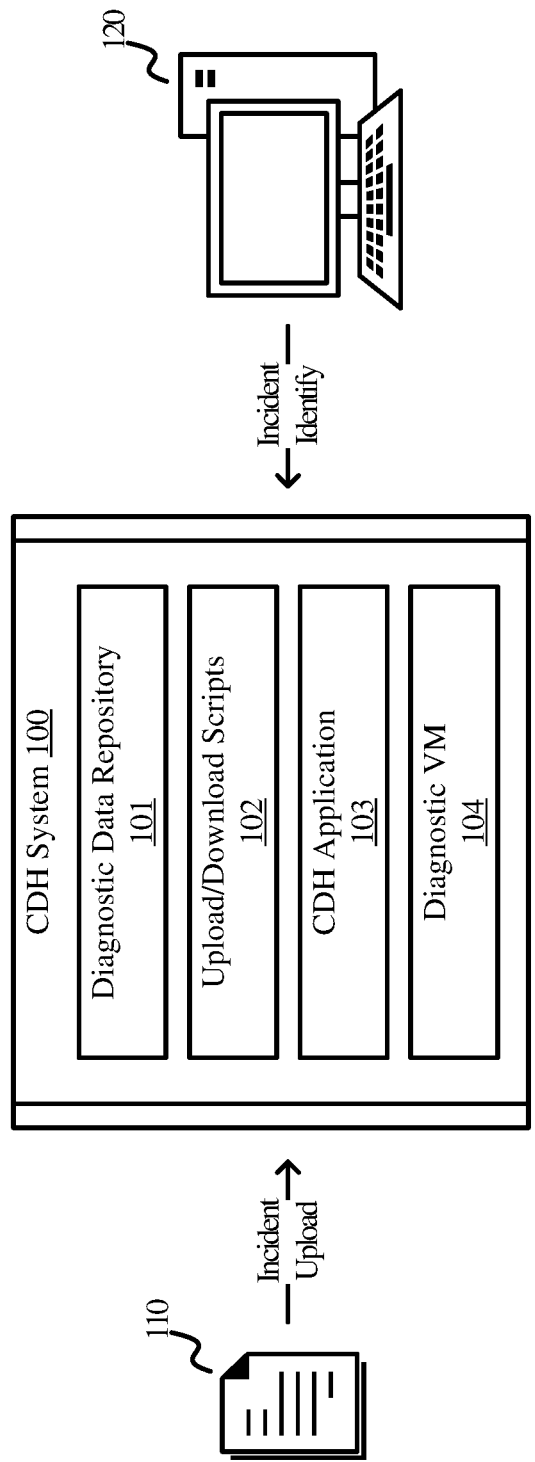
FIG. 1 illustrates an operational environment comprising a customer data handling system in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to secure customer data handling. More specifically, the present technology relates to systems and methods for handling customer data as a service provider in a manner that supports the core security principles of customer data handling and provides providers a stronger level of control over derivative data for providers. The customer data handling (CDH) toolkit disclosed herein enables service and cloud providers (e.g., SaaS, PaaS, IaaS, private clouds, on-premise deployments, etc.) to provide unparalleled data stewardship for customers while also improving operational efficiencies. The solution supports four core principles of customer data handling: no export of customer data, unless authorized; remote operations only via shell access or equivalent; temporary and task-based privileges; and diagnostic data to be ephemeral.

The CDH toolkit herein consists of four major components: a central repository for the storage of diagnostic data; an upload tool for uploading data to the central repository; a diagnostic virtual machine (VM) that enables task-based access to diagnostic data and analysis tools hosted on a dedicated container; and a CDH application for requesting access to diagnostic data and tools, providing access, container provisioning and staging, and purging the container along with the copy of diagnostic data in the container. Thus, when an authorized data accessor (for example, a support/ DevOps engineer or any program, tool, app, software, hardware, or combination thereof) requests to access diagnostic data related to one or more tasks and/or incidents, a temporary container is provisioned, upon authorization, for the specific purpose. Inside the container, the data accessor may complete the one or more tasks or analyses related to the incident before exiting the container, at which time the container and copy of the data are purged from the system. While working within the secure production environment (i.e., the container), a user is unable to share or export the data to an external location, thereby ensuring full trackability of data while also enabling individual access to certain users. An incident may include the occurrence of any event or state related to a provided service as described herein. In some examples, an incident includes a dataset related to normal functioning of a provided service. Additional examples of incidents may include, for example, an occurrence of abnormal functioning, the occurrence of normal functioning, a data upload event from a CDH upload tool, an error, an error report, a bug incident, or a similar scenario for which the data accessor may wish to access data for purposes of evaluating general performance, fixing bugs, addressing errors, or other general analysis, observation, tuning, verification, or investigation.

The SaaS CDH solution herein enables cloud provider teams to achieve full alignment with the core CDH principles by providing a system comprised of diagnostic data repositories and hosted analysis tools within the secure production environment segregated on a per-task or per-incident basis. The CDH toolkit solution accelerates processes for requesting access such that a task can be performed with a shorter turn-around time. The solution further improves productivity of engineers by isolating tasks in containers so that they do not have to reconfigure their environment for working on different tasks at any given time. Multiple engineers may share an incidents container to collaborate and provide around the clock coverage without the need to start from scratch. Furthermore, the CDH toolkit significantly reduces both a customer's and a provider's exposure to risk and improves handling of customer data by enforcing effective access controls and purging of data. The solution herein provides full control over the lifecycle of customer diagnostic data, wherein trackability of the data is maintained at all times as it is used by various engineers or provider personnel during analysis or troubleshooting related to various customer incidents. The technology herein may be used to handle all customer data in this way— complete trackability and no ability to download or extract (including derivative data)—and keeps the data inside the secure production environment.

In existing systems, data may be stored inside a corporate firewall with role-based access, wherein work location restricted access is imposed in limited cases. Diagnostic data is persisted, purging is not enforced, and there is no ability to track exported data. Similarly, parsing and analysis tools run on personal workstations while access controls impose standing access on users, where access is only revoked in response to role changes. However, customers trust their providers to use their data in a secure manner and on a need-to-know basis. Diagnostic data has been traditionally left out from the scope of that protection. In these existing technologies, few technical controls exist for data export and the security of derivative data relies on employee policy adherence. If a user shares a log file to another location or another user, they traditionally share the file to a mount point, at which point the other location or user can access the file from the mount point. In an example scenario, if a customer of a service provider reports a problem, they may contact support and the provider may create a record (i.e., a bug database) for the problem. In addition, any diagnostic data info supplied by the customer in relation to the problem may be attached to the incident record in the bug database, wherein any users with access to the bug database could access the data related to any incident in the database. This creates an environment of uncontrolled access to customer diagnostic data. In the present technology, the provider has more control over what data can be accessed in relation to an incident while also providing more restricted access to incidents.

In the system presented herein, data may be accessed only through an ephemeral container, wherein data is temporarily pushed into the provisioned container for an incident in response to a valid request. A data accessor or multiple accessors, for example, may go to a user interface of the CDH application and request access to data for a specific incident. Upon being approved for access based on policies, credentials, and the like, a container is provisioned for the incident comprising the diagnostic data for the specific incident and any relevant tooling. The data accessor may then use the data within the provisioned container to perform parsing, troubleshooting, and analysis jobs without the ability to download, export, or otherwise communicate the data outside of the provisioned container. Upon completing a task or analysis, the data accessor may exit the provisioned container, at which time (or at a later time) the container, along with the any data in the container, is purged from the system. In some examples, the data accessor may not need to exit or close a container, and the container may be purged after the container has been unused or left idle for a certain period of time. In other examples, the container may be purged after the expiration of an allowed time.

FIG. 1 illustrates an example of a customer data handling environment that includes CDH system 100 in accordance with the technology disclosed herein. FIG. 1 includes CDH system 100, which comprises diagnostic data repository 101, upload tool 102, CDH application 103, and diagnostic VM 104. FIG. 1 further includes incident data 110 and computing device 120. In an example, incident data 110 is uploaded to diagnostic data repository 101 in response to a customer error report. A user operating computing device 120 may then identify and request access to the incident data for one or more purposes (e.g., bug detection, analysis, investigation, etc.). In response to the request for access to the incident data stored in diagnostic data repository 101, CDH application 103 determines whether or not the user and/or computing device 120 have the necessary credentials or authorization to access the incident data. In response to determining that the user and/or computing device 120 meet the necessary requirements, CDH application 103 may automatically provision a container (e.g., a Docker container) that runs on diagnostic VM 104, stage a copy of the diagnostic data for the incident in the provisioned container, and provide computing device 120 access to the provisioned container.

Once computing device 120 is provided access to the provisioned container and staged environment, a variety of tools may be available within the environment. In some examples, the same, complete set of tools may be provided in every container, while in other examples, tool may be provided based on the specific incident, service restrictions, and similar factors. Upon completion of the use of the provisioned container, a user of computing device 120 may close or exit the provisioned container. After exit, CDH application 103 may automatically purge the container along with the copy of the diagnostic data provided in the container. In some examples, purging may occur immediately in response to closure of the container, while in other examples, purging may occur based on a time delay or a time interval.

Diagnostic data repository 101, in some examples, is an object storage service (OSS). Separate instances of diagnostic data repository 101 may be provisioned for specialty production environments or clouds that must adhere to different restrictions. For example, specialty clouds subject to Payment Card Industry (PCI) compliancy or Health Insurance Portability and Accountability Act (HIPAA) compliancy may exist such that the diagnostic data within those instances can comply with their respective requirements. Upload tool 102, in some examples, may include a compiled binary (upload tool) for uploading diagnostic data to diagnostic data repository 101. Diagnostic VM 104 enables task-based access to diagnostic data and analysis tools that are hosted on a dedicated container within the secure production environment.

Figure 2:
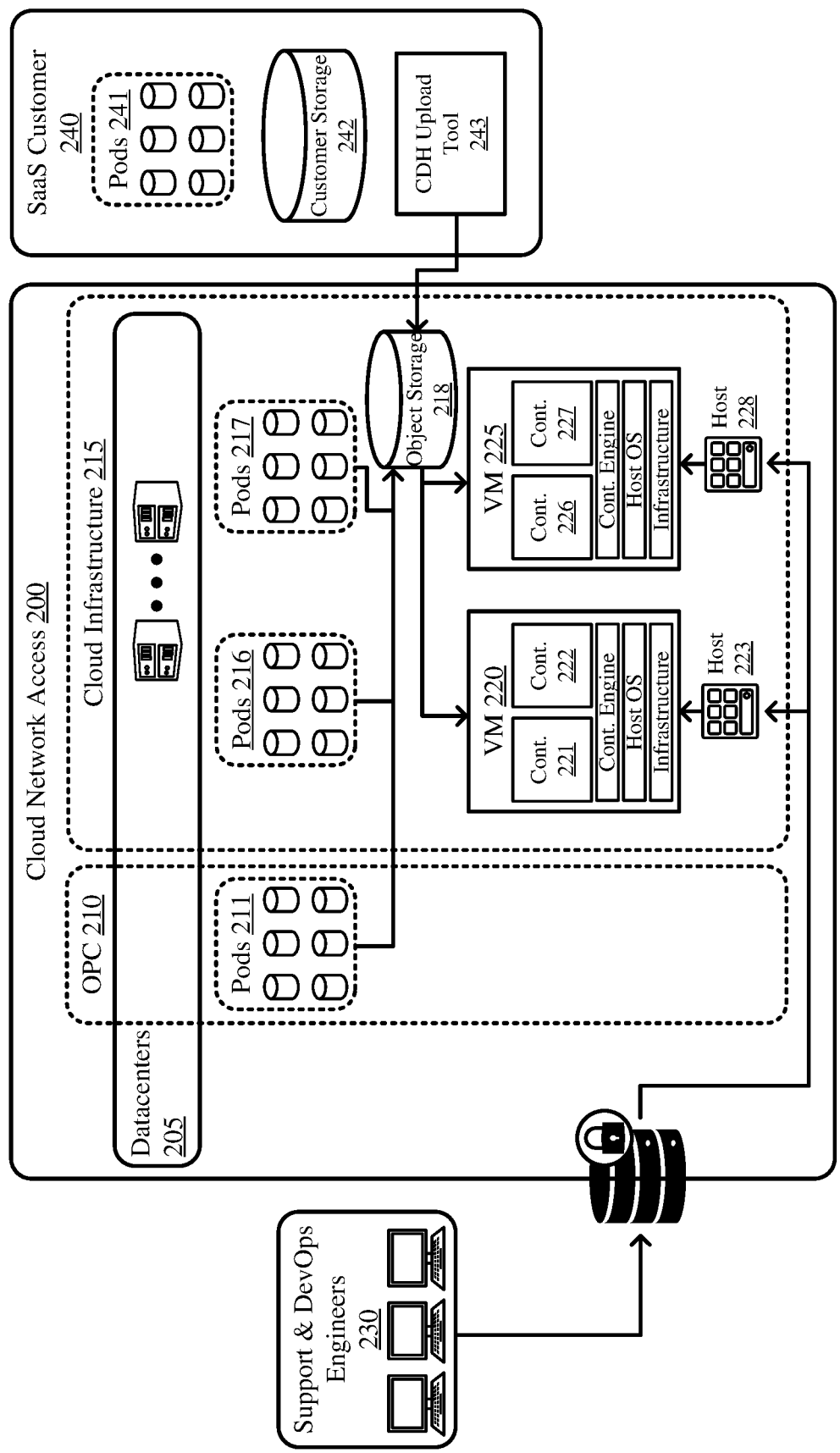
FIG. 2 illustrates a customer data handling system overview in accordance with some embodiments of the present technology.

FIG. 2 illustrates an exemplary solution design overview of the CDH system provided in accordance with the present disclosure. FIG. 2 includes cloud network access 200, Support and DevOps engineers 230, and SaaS customer 240. Cloud network access 200 includes datacenters 205, open platform communications (OPC) 210, and cloud infrastructure 215. OPC 210 includes pods 211, wherein a pod represents a grouping of one or more containers and their shared storage. Cloud infrastructure 215 includes pods 216, pods 217, object storage 218, VM 220, VM 225, host 223, and host 228. VM 220 includes container 221, container 222, a container engine, a host operating system, and an infrastructure (e.g., server, hardware). VM 225 includes container 226, container 227, a container engine, a host operating system, and an infrastructure. VM 220 and VM 225 may comprise any number of containers and the number of containers hosted on either of the virtual machines may vary. The components of cloud network access 200 including VM 220 and VM 225 are provided for purpose of example and may differ according to different implementations of the present technology. FIG. 2 further includes SaaS customer 240, which includes pods 241, customer storage 242, and customer specific CDH upload tool 243.

In an example, SaaS customer 240 may report an incident experienced while using the provided service. SaaS customer 240 may then provide data for the incident from customer storage 242 to object storage 218 using customer specific CDH upload tool 243. In some examples, the customer may provide incident data to the provider themselves. In other examples, an engineer or other member from the provider team may be tasked with accessing the incident data in customer storage 242 and pushing the data to object storage 218 in the cloud environment using customer specific CDH upload tool 243 or a similar tool. In yet another example, data from customer storage 242 may be retrieved in response to a request from support & DevOps engineers 230 to access data for an incident. Object storage 218 is the central data repository for diagnostic data. In some examples, separate instances of object storage 218 are provisioned for specialty clouds subject to different rules and regulations.

Once data for a specific incident has been uploaded to object storage 218, support & DevOps engineers 230 having the required permissions may access the incident data through a provisioned container hosted on a virtual machine (i.e., VM 220) within the secure environment (i.e., cloud network access 200). Support & DevOps engineers 230 may log in to cloud network access 200 or otherwise request approval to access the incident data for a given incident. Upon being approved to access the incident and secure environment, a provisioning workflow may begin in which a container (e.g., container 221, container 222) is provisioned for the incident and the diagnostic data for the incident is staged within the container along with various tools for analyzing or working with the data. The engineer may then be notified and provided access to the provisioned container through a host (i.e., host 223). From within the provisioned container, the engineer has no ability to transport any of the incident data outside of the environment. For example, there may be no ability to download data, export data, or access the Internet from within a provisioned container thereby ensuring complete trackability of the data.

Within the container, an engineer may perform various tasks including but not limited to analyzing log files, analyzing memory or core dumps, drawing correlations between pieces of log files, parsing data, performing comparisons, and searching for events or datapoints, and the environment may include tools for performing these tasks. Any number of tools may be provided within a container. If an engineer wants to include a new or additional tool to their provisioned environment, they may go through a validation process in which the tool is checked for licensing and/or security approval before loading it into a container. In some embodiments, engineers may be blocked from attempting to install new tools and required to submit a request to have a CDH DevOps team take a new tool through various validations before deployment the tool system-wide. In this manner, a user is prevented from downloading, installing, and using unapproved, unsafe, or insecure tools that could expose customer data to vulnerabilities.

Upon completion of a task or set of tasks related to the incident data for which a container was provisioned, the user or engineer may close, leave, or exit the provisioned environment at which time the container and its copy of the diagnostic data is automatically purged. In some examples, only the copy of the data may be purged along with the container, while another set of the data stills exists in object storage 218. In alternative examples, the incident data may be purged from object storage 218 as well. In certain examples, the copy of the data from object storage 218 may be purged after a longer period of time as compared to the container, thereby allowing the provider to create a new container at a later to reanalyze the issue for the same customer or as part of the product bug fix process.

Figure 3:
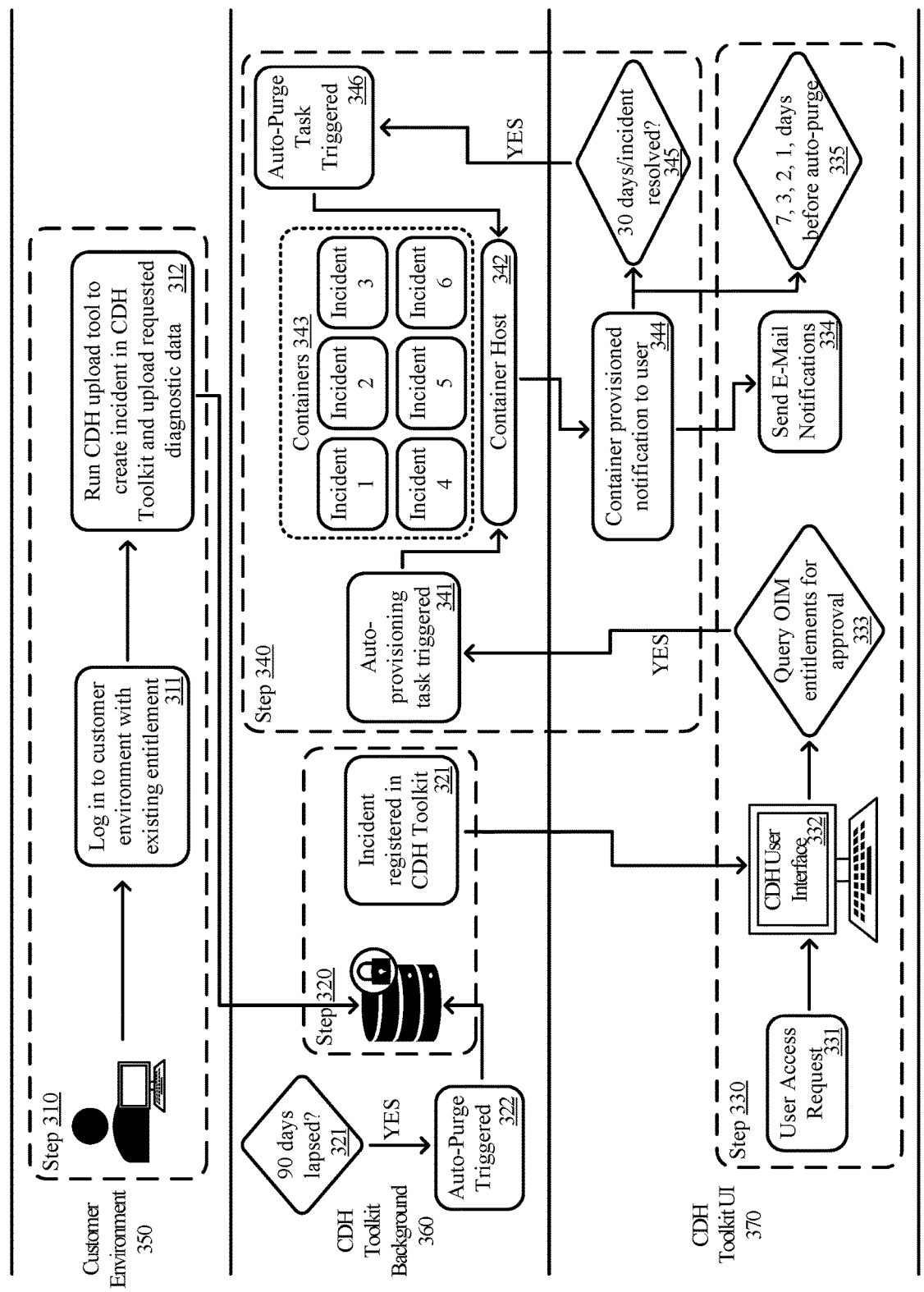
FIG. 3 illustrates a process overview for customer data handling in accordance with some embodiments of the present technology.

FIG. 3 illustrates an exemplary customer data handling workflow including step 310, step 320, step 330, and step 340, which are comprised within customer environment 350, CDH toolkit backend 360, and CDH toolkit user interface (UI) 370. Step 310 comprises step 311 and step 312. Step 320 comprises step 321. Step 330 comprises step 331, step 332, step 333, step 334, and step 335. Step 340 comprises step 341, step 342, step 344, 345, and step 346. Step 310 is performed within customer environment 350, step 320 is performed within CDH toolkit backend 360, step 330 is performed within CDH toolkit UI 370, and step 340 is performed within a combination of CDH toolkit backend 360 and CDH toolkit UI 370.

In step 311, a user or engineer logs in to customer environment 350 using existing or pre-approved entitlements and/or credentials. In step 312, the user or engineer runs the CDH upload tool to create an incident in the CDH toolkit and uploads the requested or relevant diagnostic data.

In step 321, the incident is registered in the CDH toolkit. In step 331, user access is requested from within CDH toolkit UI 370 and the CDH user interface is provided in step 332. In step 333, the identity management service is queried for entitlements for approval of the user. If the user is approved, an auto-provisioning task is triggered in step 341 and a container (i.e., one of containers 343) is provisioned on the container host in step 342. In step 344, a notification is sent to the user indicating that the container for their requested incident has been provisioned and in step 334, an email notification is sent. The user may then access the container comprising the incident-specific data and tooling. In step 335, a user may be notified that their container will be purged after a certain number of days (e.g., 7 days, 3 days, 2 days, 1 day) based on system/platform settings. A user may be able to request a time extension in some examples. In an alternative embodiment, a user may indicate how many days should elapse before the container and copy of the data are automatically purged. In some embodiments, a user may be allowed to manually purge their container at any time. In step 345, the CDH toolkit checks if 30 days have elapsed or if the incident has been resolved. If one or both of those are true, the automatic purge task is triggered and the container along with the copy of the incident data is purged in step 346.

In addition to the container provisioning steps provided in step 310, step 320, step 330, and step 340, data may be purged from the secure data repository after a certain amount of time or in response to an event. In the present example, in step 321, the CDH toolkit checks if 90 days have elapsed since the incident data was uploaded and if so, initiates an automatic purge of the data from the secure storage in step 322.

Figure 4:
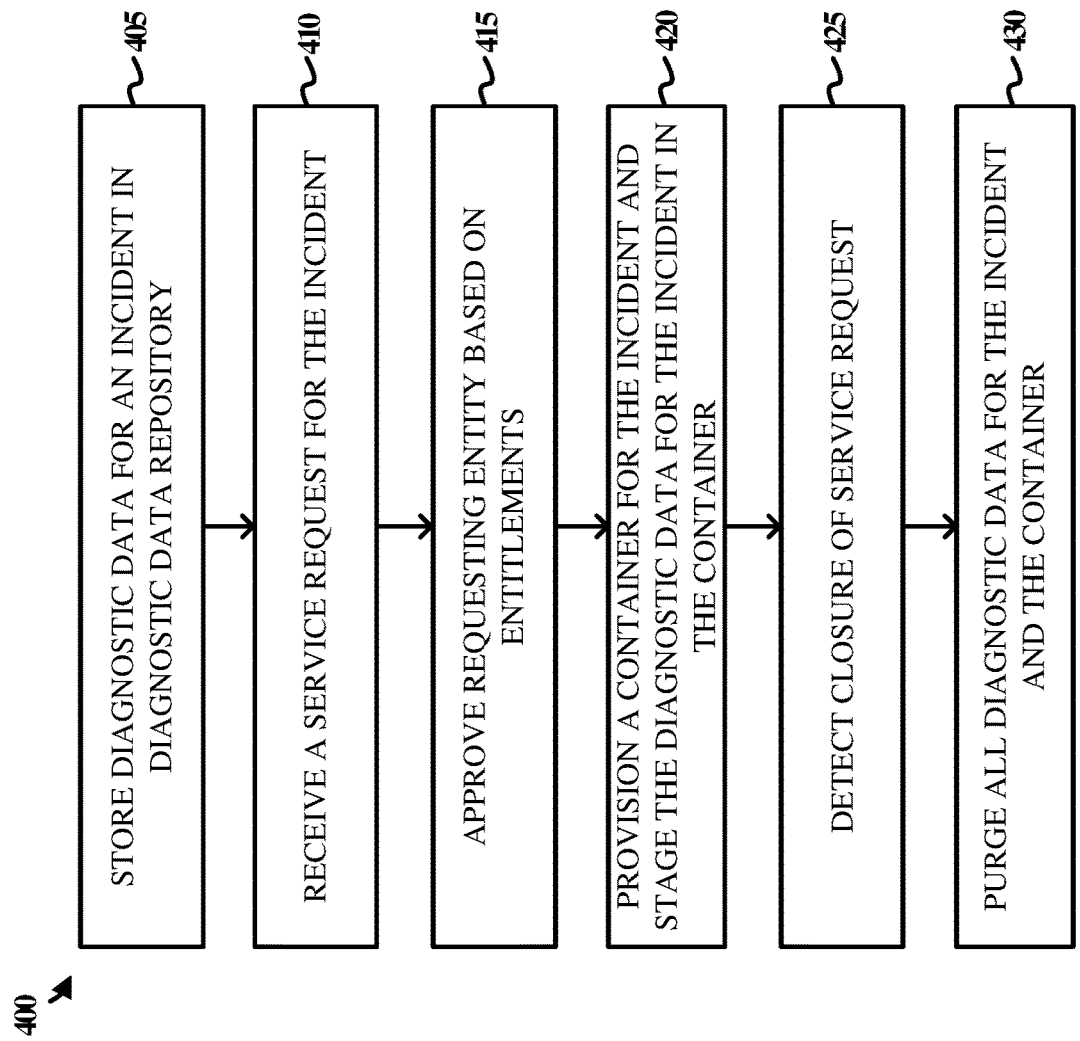
FIG. 4 illustrates a customer data handling process in accordance with some embodiments of the present technology.

FIG. 4 illustrates a customer data handling process that may be performed by the CDH system disclosed herein. In step 405, the CDH system stores the diagnostic data for an incident in a diagnostic data repository. In some examples, step 405 may be triggered by an incident report and may be in response to an automatic data upload of the diagnostic data for the incident, the upload by the user of the service that experienced the incident, or by a service provider user initiating the upload. In step 410, the CDH system receives a service request for the incident from a user or engineer. The service request may include an indication of the incident that the user or engineer is trying to access. In step 415, the CDH system approves the requesting entity (i.e., the user or engineer) based on entitlement associated with the requesting entity. In some examples, an identity management system is used for approval of requesting entities. In some examples, the identity management system may be specific to the CDH system of the present example. Alternatively, the identity management system may be a centralized system accessible to the provider for many services in some examples.

In response to approval of the requesting entity, the CDH system provisions a container for the incident and stages the incident-specific diagnostic data in the dedicated container in step 420. Along with the diagnostic data, the CDH system stages any required analysis tools in the container. In some implementations, the container may be a dedicated Docker container hosted on a virtual machine, while in other implementations, the container is hosted by an alternative container host and may be hosted on an alternative computing machine. The provisioned container, in the present example, is locked down in a secure environment (i.e., the cloud) in a virtual private network that requires a number of different entitlements and is subject to a variety of access controls. In step 425, the CDH system detects a closure of the service request and in step 430, the CDH system purges the container and the copy of diagnostic data for the incident that was staged within the container.

The CDH system provided herein may include an application (e.g., CDH application 103) that exists outside of the containers and provides a UI for authorized personnel to request access to the task-based diagnostic data (i.e., the incident-specific data) based on entitlements and approvals. The application is responsible for the automatic provisioning of the task-based container within the secure environment (i.e., cloud network access 200) as well as job control integration between the system components and notifications/reporting. The application is further responsible for the automatic purging of the task-based diagnostic data and related container. The CDH toolkit provided herein allows data to be ephemeral by enabling the provider to effectively purge diagnostic data upon completion of a task (i.e., upon closure of a service request and return to application UI). This automated purge mechanism may purge, after a grace period in some examples, all associated data in response to the service request closure.

Figure 5:
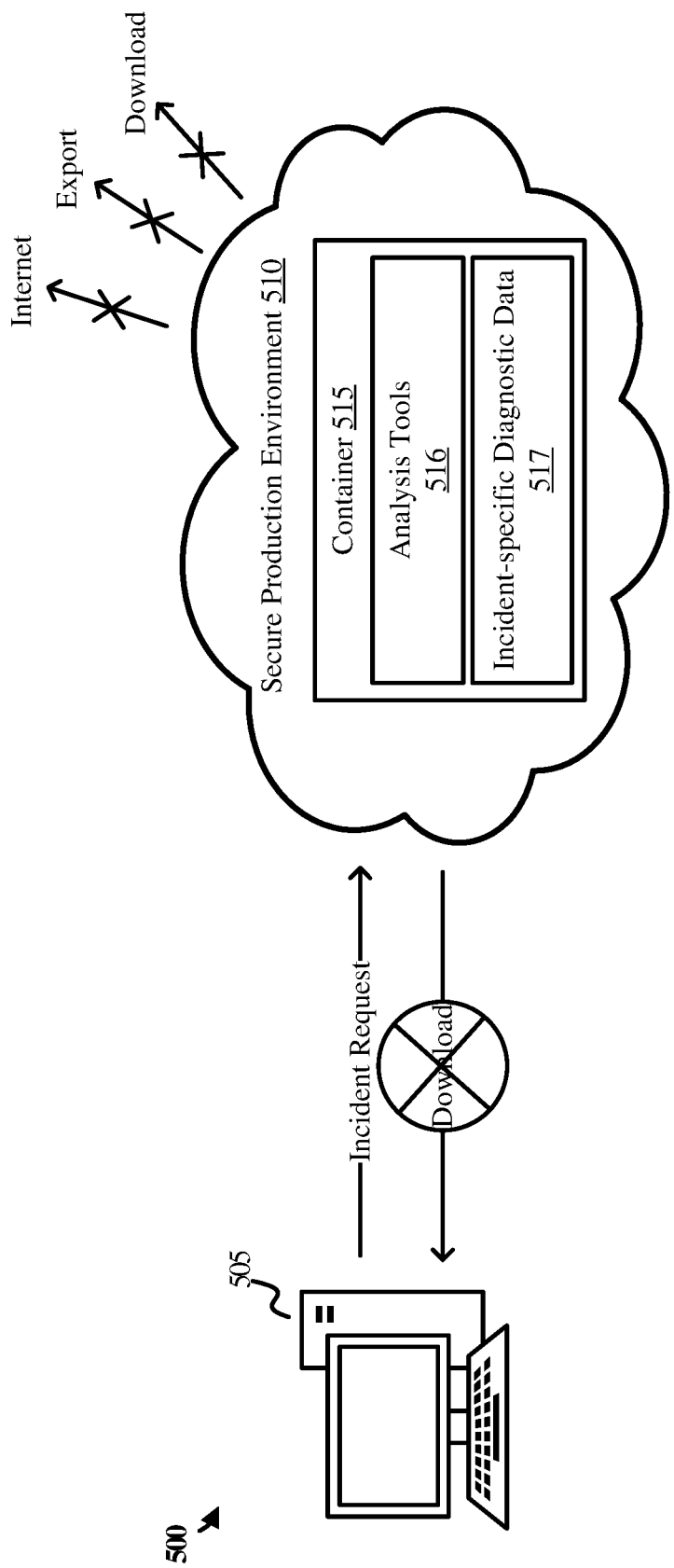
FIG. 5 illustrates a secure customer data handling environment in accordance with some embodiments of the present technology.

FIG. 5 illustrates CDH access environment 500 which provides an exemplary overview of incident-specific customer data access. CDH access environment 500 includes computing device 505 and secure production environment 510. Computing device 505 may be representative of any form of computing device including but not limited to a desktop computer, a laptop, a mobile device, a cell phone, or a tablet. Secure production environment 510 includes container 515, which comprises analysis tools 516 and incident-specific diagnostic data 517. In the present example, an engineer may initiate a request to access incident-specific data via computing device 505. In response to being approved for access based on requirements that may include but are not limited to user entitlements, device requirements, and location requirements, computing device 505 may be approved for access to diagnostic data for the requested incident.

In response to being approved, container 515 is provisioned specifically for the requested incident. In some examples, in response to the provisioning of the container, the engineer is notified that the container is ready and informed of how to access the provisioned container. Incident-specific diagnostic data 517 provided in container 515 may include any data, reports, or other derivative data relevant to the incident and analysis tools 516 therein may include any relevant parsing or analysis functionality in addition to other tools. From within container 515, computing device 505 has no ability to download any information or data from the container. Similarly, computing device 505 is provided no ability to export data or access the internet, external networks, or internal networks from within the container.

Figure 6:
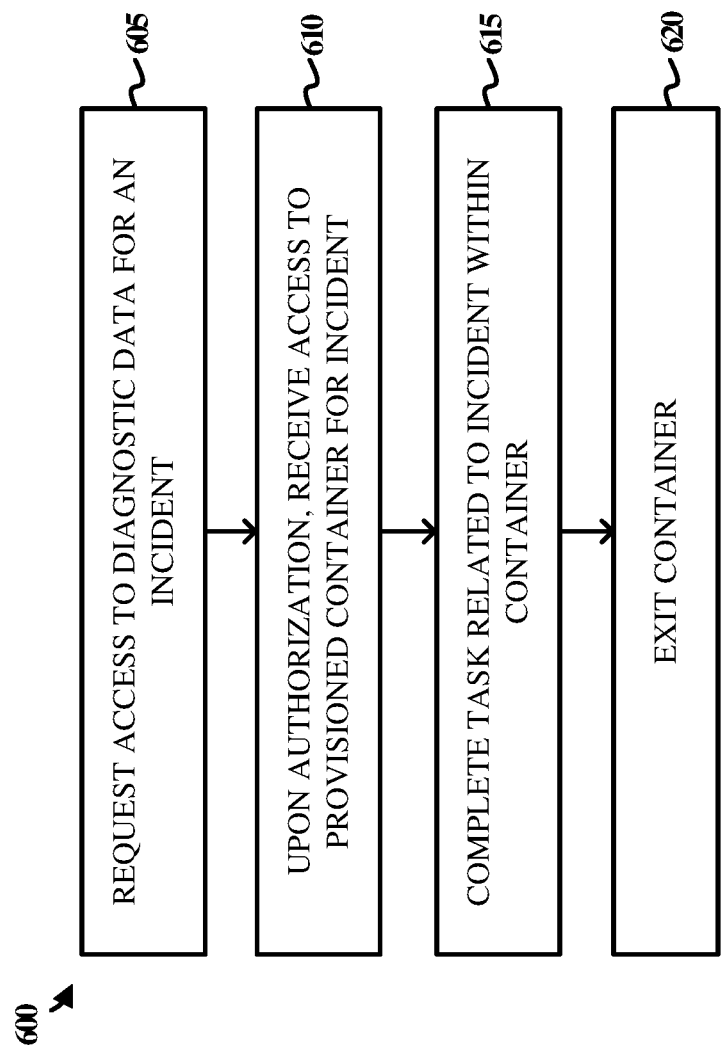
FIG. 6 illustrates a customer data handling process in accordance with some embodiments of the present technology.

FIG. 6 illustrates data access process 600 that provides an exemplary overview of the steps that may be performed by an engineer or similar user to access diagnostic data and perform a task in accordance with the incident-specific and task-based data access policies described herein. In step 605, the engineer requests access to the diagnostic data for an incident via a CDH application (e.g., CDH application 103) user interface. In step 610, the engineer, upon authorization, receives access to a provisioned container for the incident. The container, as previously discussed, includes the incident-specific data and task-based tooling. The engineer may then access the container and complete one or more tasks related to the incident within the container in step 615. Upon completion of the one or more tasks, the engineer exits the container and returns to the user interface of the CDH application.

Figure 7:
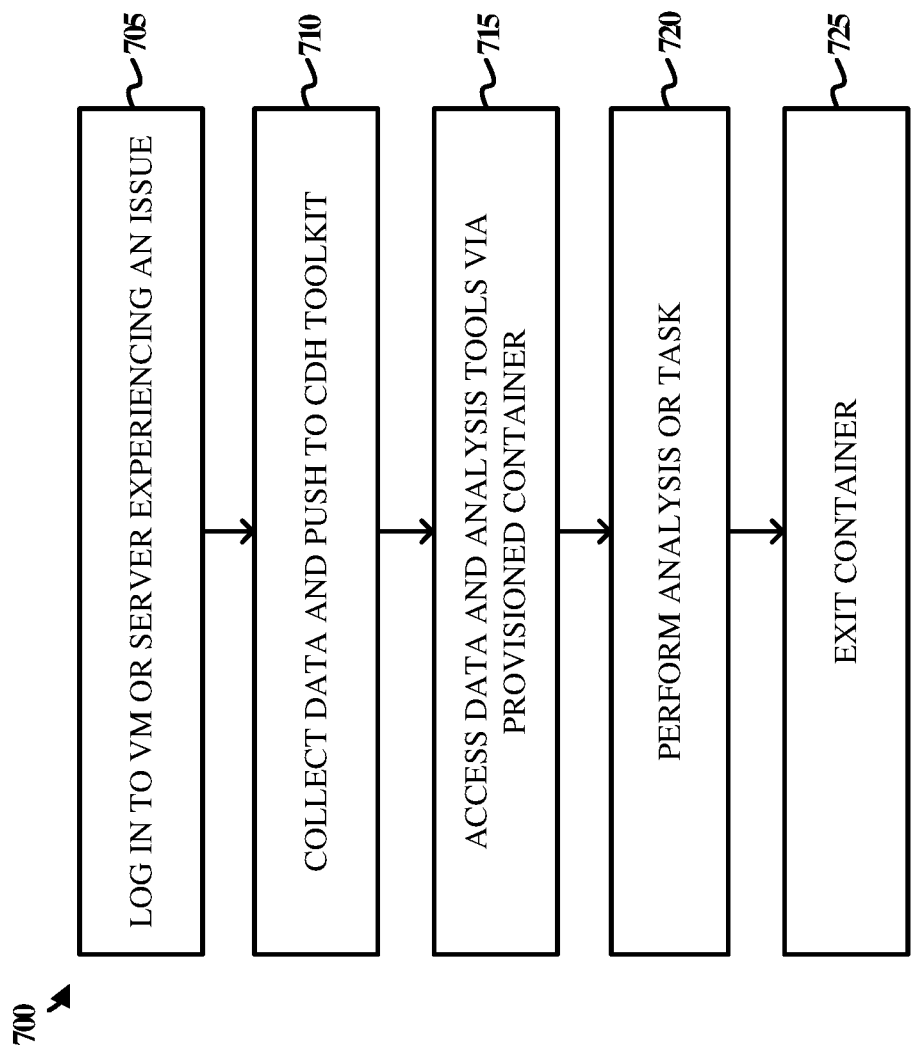
FIG. 7 illustrates a customer data handling process in accordance with some embodiments of the present technology.

FIG. 7 illustrates a customer data handling process that may be performed by a user or engineer associated with a SaaS provider. In the present example, incident data is not automatically uploaded to the CDH toolkit, and so it is manually pushed to the toolkit from the machine experiencing the issue. Thus, in step 705 of the present example, a user logs in to a virtual machine or a server experiencing issues. In some examples, a user or customer of the SaaS offering may have reported the issue or incident, thereby indicating that an engineer should upload the associated data to the CDH toolkit and look into the incident. In step 710, the engineer collects the data related to the incident and pushes the data to the CDH toolkit.

In step 715, the engineer accesses the data pushed to the CDH toolkit via a container provisioned by the CDH toolkit along with analysis tools provided in the container. The container is accessed through the CDH toolkit system and the only data provided in the container is the data for the specific issue or the task that the engineer is to perform. In some examples, accessing the container requires approval through a data access approval system before the container is provisioned by the CDH toolkit. Once the engineer has accessed the container, he or she may perform an analysis or task related to the issue or incident, as shown in step 720, which may include actions such as troubleshooting or parsing, as just a couple of examples. Once the engineer has finished any or all tasks or analyses, he or she may exit the container in step 725, at which point the container and the copy of the data in the container are auto-purged or queued to be purged at a later time.

FIG. 8 illustrates a variety of data categories in table 800 that may be used by a service provider (e.g., SaaS, PaaS, IaaS, private clouds, on-premise, etc.) to control data use in accordance with certain embodiments of the present technology. The columns of table 8 include data categories, permitted attachments, whether the data is shareable outside the cloud network, and whether the data is pre-approved. The data categories shown in table 8 include "your content", "customer data", "service analysis data", "diagnostic data", and "control data". Different types of data may be subject to different restrictions. Data may be segregated according to the data categories included in table 800 on a per-incident and per-cloud service basis. Segregating data into categories enables adherence to contractual obligations through a set of patterns established for each data type, as discussed more in reference to FIG. 9.

Figure 9:
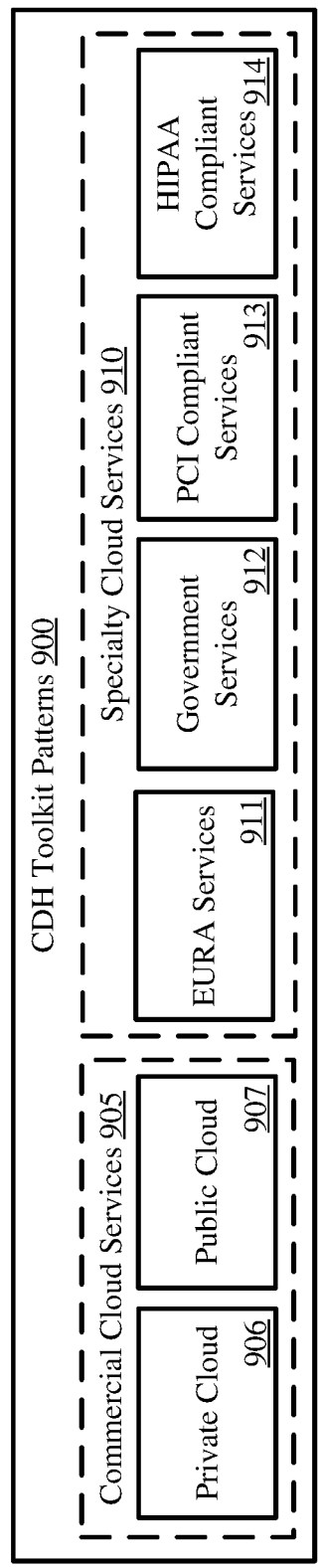
FIG. 9 illustrates several types of customer data handling toolkit patterns that may be used for different types of provided services in accordance of the present technology.

FIG. 9 illustrates a variety of CDH toolkit patterns that may be used by Cloud provider to ensure adherence to contractual obligations and regulations. FIG. 9 includes CDH toolkit patterns 900. CDH toolkit patterns 900 includes commercial cloud services 905 and specialty cloud service 910. Commercial cloud services 905 includes patterns private cloud 906 and public cloud 907. Specialty cloud services 910 include European Union Restricted Access (EURA) Services 911, government services 912, Payment Card Industry (PCI) compliant services 913, and Health Insurance Portability and Accountability Act (HIPAA) compliant services 914.

The CDH toolkit patterns may be used to segregate datasets based on different regulations that a customer may be subject to. Different cloud customers may fall into different categories and therefore may be segregated into different instances of the CDH toolkit as shown in CDH toolkits patterns 900. The different instances of the CDH toolkit are segregated such that each instance may adhere to pattern rules for policies related to data access, data residency, and the like. In some examples, the same CDH application may be used on the front end for access to data in the different instances of the CDH toolkit, while the instances are provisioned in different datacenters or different regions on the backend.

Figure 10:
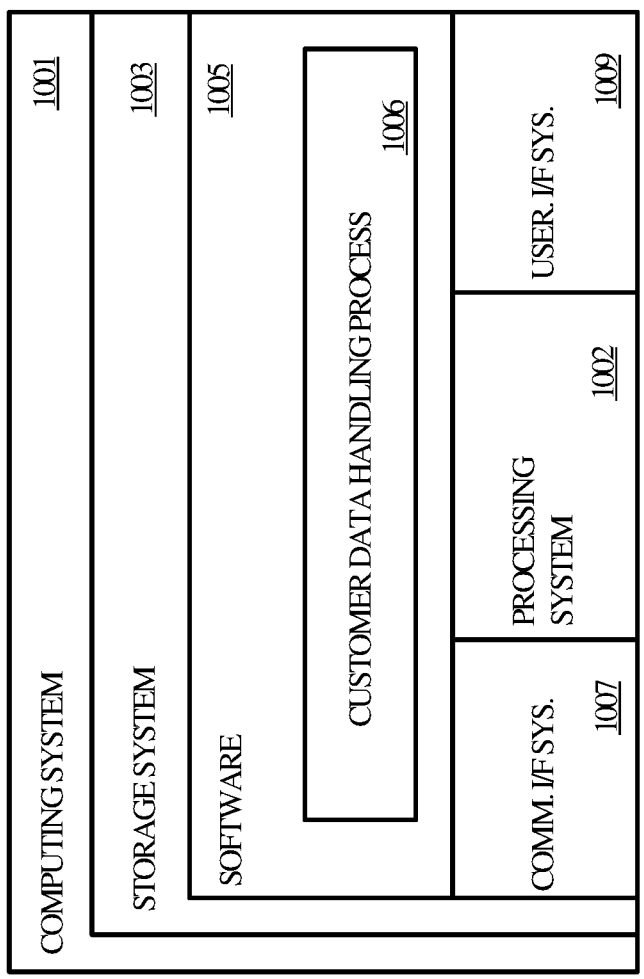
FIG. 10 illustrates a computing system for implementing a customer data handling toolkit in accordance with some embodiments of the present technology.

FIG. 10 illustrates computing system 1001 that is representative of any system or collection of systems in which the various processes, systems, programs, services, and scenarios disclosed herein may be implemented. Examples of computing system 1001 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009.

Processing system 1002 loads and executes software 1005 from storage system 1003. Software 1005 includes and implements customer data handling process 1006, which may be representative of any of the customer data handling processes discussed with respect to the preceding Figures. When executed by processing system 1002 to provide a customer data handling toolkit, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including customer data handling process 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing a secure diagnostic data handling system as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded into processing system 1002 and executed, transform a suitable apparatus, system, or device (of which computing system 1001 is representative) overall from a general-purpose computing system into a special-purpose computing system customized to provide a customer data handling toolkit as described herein. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of SaaS offerings, SaaS customer data, cloud storage, and/or datacenters, it should be understood the customer data handling systems and methods described herein are not limited to such embodiments and may apply to a variety of other data handling environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computing apparatus for handling customer data, the computing apparatus comprising:
   one or more computer readable storage media;
   one or more processing systems; and
   program instructions stored on the one or more computer readable storage media, wherein the program instructions, when executed by the one or more processing systems, direct the one or more processing systems to:
   in response to a request from a data access or to access diagnostic data associated with an incident, identify data associated with the incident stored in a diagnostic data repository;
   determine that the data accessor is approved to access the diagnostic data associated with the incident;
   provision a temporary container for the incident, the temporary container comprising the diagnostic data associated with the incident and at least one data analysis tool, wherein the diagnostic data cannot be exported from the temporary container to a location external to the temporary container;
   provide the data accessor access to the temporary container;
   maintain the temporary container while the data accessor completes one or more tasks related to the incident; and
   after the data accessor exits the temporary container, purge the temporary container from the computing apparatus.

2. The computing apparatus of claim 1, wherein the program instructions further direct the one or more processing systems to maintain the diagnostic data repository, wherein the diagnostic data repository comprises diagnostic data for a plurality of incidents.

3. The computing apparatus of claim 1, wherein the program instructions further direct the one or more processing systems to, after provisioning the temporary container for the incident, notify the data accessor that the temporary container is ready.

4. The computing apparatus of claim 1, wherein the diagnostic data is not accessible from outside a temporary container.

5. The computing apparatus of claim 1, wherein the program instructions further direct the one or more processing systems to, prior to purging the temporary container from the computing apparatus, detect that the data accessor has exited the temporary container.

6. The computing apparatus of claim 1, wherein the temporary container is hosted on a virtual machine.

7. The computing apparatus of claim 1, wherein the program instructions, to purge the temporary container from the computing apparatus, direct the one or more processing systems to identify a wait time for purging the temporary container and purge the temporary container from the computing apparatus once the wait time has elapsed.

8. A method of securely handling customer data, the method comprising:
   in response to a request from a data accessor to access diagnostic data associated with an incident, identifying data associated with the incident stored in a diagnostic data repository;
   determining that the data accessor is approved to access the diagnostic data associated with the incident;
   provisioning a temporary container for the incident, the temporary container comprising the diagnostic data associated with the incident and at least one data analysis tool, wherein the diagnostic data cannot be exported from the temporary container to a location external to the temporary container;
   providing a data accessor access to the temporary container;

maintaining the temporary container while the data accessor completes one or more tasks related to the incident; and after the data accessor exits the temporary container, purging the temporary container.

9. The method of claim 8, further comprising maintaining the diagnostic data repository, wherein the diagnostic data repository comprises data for a plurality of incidents.

10. The method of claim 8, further comprising, after provisioning the temporary container for the incident, notifying the data accessor that the temporary container is ready.

11. The method of claim 8, wherein the diagnostic data is not accessible from outside a temporary container.

12. The method of claim 8, further comprising, prior to purging the temporary container, detecting that the data accessor has exited the temporary container.

13. The method of claim 8, wherein the temporary container is hosted on a virtual machine.

14. The method of claim 8, wherein purging the temporary container comprises identifying a wait time for purging the temporary container and purging the temporary container once the wait time has elapsed.

15. One or more non-transitory computer-readable storage media having program instructions stored thereon to facilitate secure customer data handling that, when read and executed by a processing system, direct the processing system to at least:

in response to a request from a data accessor to access diagnostic data associated with an incident, identify data associated with the incident stored in a diagnostic data repository;

determine that the data accessor is approved to access the diagnostic data associated with the incident;

provision a temporary container for the incident, the temporary container comprising the diagnostic data associated with the incident and at least one data analysis tool, wherein the diagnostic data cannot be exported from the temporary container to a location external to the temporary container;

provide the data accessor access to the temporary container;

maintain the temporary container while the data accessor completes one or more tasks related to the incident; and after the data accessor exits the temporary container, purge the temporary container.

16. The one or more non-transitory computer-readable storage media of claim 15, wherein the program instructions, when read and executed by the processing system, further direct the processing system to maintain the diagnostic data repository, wherein the diagnostic data repository comprises diagnostic data for a plurality of tasks.

17. The one or more non-transitory computer-readable storage media of claim 15, wherein the program instructions, when read and executed by the processing system, further direct the processing system to, after provisioning the temporary container for the incident, notify the data accessor that the temporary container is ready.

* * * * *

UNITED STATES PATENT AND TRADEMARK OFFICE
CERTIFICATE OF CORRECTION

| | |
|---|---|
| PATENT NO. | : 11,841,971 B2 |
| APPLICATION NO. | : 17/036300 |
| DATED | : December 12, 2023 |
| INVENTOR(S) | : Safi et al. |

Page 1 of 1

It is certified that error appears in the above-identified patent and that said Letters Patent is hereby corrected as shown below:

In the Drawings

On sheet 8 of 10, in FIGURE 8, Line 10, delete "Non-Sentitive" and insert -- Non-Sensitive --, therefor.

In the Specification

In Column 8, Line 16, delete "Internet" and insert -- internet --, therefor.

In Column 14, Line 14, delete "Internet," and insert -- internet, --, therefor.

In the Claims

In Column 16, Line 6, in Claim 1, delete "access or" and insert -- accessor --, therefor.

Signed and Sealed this
Twenty-fifth Day of June, 2024

Katherine Kelly Vidal
*Director of the United States Patent and Trademark Office*